United States Patent [19]

Strahl

[11] Patent Number: 4,465,696

[45] Date of Patent: Aug. 14, 1984

[54] HIGH PROTEIN SPROUTED MUNG BEAN FOOD MIX AND METHOD OF PREPARATION

[75] Inventor: David M. Strahl, Plainfield, Ind.

[73] Assignee: King Sprout Products, Inc., Indianapolis, Ind.

[21] Appl. No.: 455,018

[22] Filed: Jan. 3, 1983

[51] Int. Cl.³ .............................................. A23L 1/20
[52] U.S. Cl. ........................................ 426/63; 426/64; 426/302; 426/589; 426/634; 426/652
[58] Field of Search ............... 426/104, 460, 482, 589, 426/598, 629, 634, 652, 302

[56] References Cited

U.S. PATENT DOCUMENTS 2,522,409  9/1950  Stroller .............................. 426/634
3,752,677  8/1973  Andrews et al. .................... 426/589
4,140,803  2/1979  Panchuk et al. ...................... 426/93

*Primary Examiner*—Robert A. Yoncoskie
*Assistant Examiner*—Marianne S. Minaick
*Attorney, Agent, or Firm*—Woodard, Weikart, Emhardt & Naughton

[57] ABSTRACT

A dry food mix including principally dehydrated ground mung bean sprouts and method of producing same. The sprouts are harvested upon three days growth with the outer seed coat being removed therefrom. The sprouts are coated with a water solution including tomato and hydrolyzed plant protein. The coated sprouts are dehydrated to a moisture content of approximately 5 percent and subsequently ground and dry blended with a mix. The mix is varied to produce mung bean burger mix, mung bean instant soup and mung bean protein drink.

8 Claims, No Drawings

HIGH PROTEIN SPROUTED MUNG BEAN FOOD MIX AND METHOD OF PREPARATION

BACKGROUND OF THE INVENTION

This invention is in the field of food preparations and more specifically those utilizing beans as the predominant ingredient. The invention relates to many different food mixes including a dehydrated mung bean burger mix, protein drink mix, and instant soup mix which may be reconstituted by the use of water or other nutritious fluids.

There are many burger mixes on the market today used for burgers or added to meat as an extender. Most of these mixes are made mainly from grains ground to a coarse consistency, with the addition of spices, flour and preservatives. The mixes are nutritious in their composition and have the appearance of meat burgers. Unfortunately, the mixes absorb moisture slowly and have a gritty consistency due to the ground grains and legumes which need more time for soaking than allowed on directions. The mixes also display a problem of not binding properly together due to the course consistency and low binding quality of ingredients. According to the present invention, a burger mix is provided with quick absorption quality, excellent texture and holding quality. The mung bean burger mix has been formulated to provide a burger with easy preparation and forming qualities, attractive appearance which can be stored for periods of time, with little or no loss of binding, holding absorption and taste qualities.

The normal bitter taste of the mung bean sprout is eliminated through the use of the method disclosed herein. This new and unexpected result is achieved by lightly coating each sprout prior to dehydrating and grinding the sprout and then subsequently mixing the particles with a specially formulated dry mix selected in accordance with the desired food mix. Further, a new and unexpected result is provided by the coating in that the mung bean burger mix displays superior binding characteristics when reconstituted with water.

The improved characteristics of the mung bean sprout is achieved through the conservation of protein in the sprouts which are harvested prior to reaching adult size. In lieu of the normal protein breakdown there appears free amino acids and amides. Further, the mung bean sprout vitamin B content increases on the average of 200 percent during the first three days of sprouting. The present invention uses low temperature in drying the sprout to conserve the vitamin protein and enzyme quality of the products.

Mung bean sprouts are a stable article of diet among the Chinese and a common ingredient of chop suey. Typically, the sprouts are prepared by thoroughly soaking the beans and germinating under a damp cloth for several days. Nevertheless, it has heretofore been unknown to utilize the sprouts in accordance with the present invention and particularly to achieve the previously described characteristics.

Beans have been combined in various products. For example, in U.S. Pat. No. 4,327,116, issued to Weith, there is disclosed a carob bean flour as an ingredient in a bakery product. A legume-base flour is disclosed in the U.S. Pat. No. 4,140,803, issued to Panchuk et al. Soybeans have been used quite extensively in various products such as the food product disclosed in U.S. Pat. No. 4,000,323. Likewise, dehydrated food products are quite well known such as shown in the method of forming a dry soup mix disclosed in U.S. Pat. No. 3,752,677, issued to Andrews et al.

SUMMARY OF THE INVENTION

One embodiment of the present invention is a method of forming mung bean sprouts for a dry food mix comprising the steps of growing mung bean sprouts in darkness under a moist cover, harvesting the sprouts prior to attainment of a height of six inches, removing the seed coat associated with the sprouts, coating the sprouts with a wet solution including predominantly water, dehydrating the coated sprouts to a moisture content less than ten percent, grinding the dehydrated sprouts, and mixing the ground sprouts with a dry food mix.

Another embodiment of the present invention is a burger mix comprising mung bean sprouts harvested prior to attainment of a height of six inches and having the seed coat removed therefrom and further including an outer coat obtained by immersion into a wet solution predominantly of water and with the sprouts being dehydrated to a moisture content of less than 10 percent and being in ground form, a mix dry blended with the sprouts with the mix including soybean ingredients, tomato powder and onion ingredients.

A further embodiment of the present invention is a mung bean soup mix comprising mung bean sprouts harvested prior to attainment of a height of six inches and having the seed coat removed therefrom and further including an outer coat obtained by immersion into a wet solution predominantly of water and with the sprouts being dehydrated to a moisture content of less than 10 percent and being in ground form, and a mix dry blended with the mung bean sprouts and with the mix including a mixture of vegetables and hydrolyzed plant protein.

Yet another embodiment of the present invention is a mung bean drink mix comprising mung bean sprouts harvested prior to attainment of a height of six inches and having the seed coat removed therefrom and further including an outer coat obtained by immersion into a wet solution predominantly of water and with the sprouts being dehydrated to a moisture content of less than 10 percent and being in ground form, and a mix dry blended with the mung bean sprouts with the mix including carob powder and brewers yeast.

It is an object of the present invention to provide a sprouted mung bean food product without the normal mung bean bitter taste.

A further object of the present invention is to provide a sprouted mung bean burger mix having superior binding characteristics.

A further object of the present invention is to provide a new food product having a primary ingredient of mung bean sprouts.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The mung bean sprouts utilized in accordance with the present invention are harvested prior to reaching adult height. The sprouts are grown in plastic trays 21"×13"×2" with ample drainage holes placed ⅛ inch in diameter every square inch on the bottom of the tray. The mung bean sprouts are grown to an age of three days until they reach at least 1½ inches in height and are harvested prior to attainment of a height of 6 inches. The sprouts must be free of debris and leaves. The leaves must be picked prior to use of the sprouts in order to minimize any bitter taste. During the growing process, the sprouts are watered with filtered water at 72° F. to improve the tast and are grown in complete darkness with a cotton non-toxic cloth placed on top of the sprouts to conserve moisture. Further, the cloth will ensure heavy, even growing of the sprouts and prevent dehydration.

The sprouted mung beans after three days or 72 hours are ready for harvesting. During the first day of sprouting, the temperature is set at 72° F. The temperature of the sprouting of the second day and third day can range from 70° F. to 76° F. It is important at all times during the sprouting operation to have a fan circulating the air above the cotton cloth.

While growing the sprouts, the tops of the trays or cloth is sprayed every four hours or four to five times daily with approximately sixteen ounces of water. The beans are placed on a flat surface without any sand or dirt being utilized. The water used in the growing operation must be filtered through an odor/taste filter and a sediment filter. Thus, most foreign elements will be removed that have an inhibiting factor on the growth of the mung bean sprouts improving the taste of the beans and allowing the beans to increase in water by 400 to 500 percent. Also, the filters eliminate the action of the growth of bacteria.

In one embodiment, a 14"×22" heavy cotton cloth having a weight of 2 ounces was placed on top of the bean sprouts. The temperature of the water sprayed on the cloth was set at 68° F. to 75° F. at all times. An ionizer was placed with the unit to prevent bacteria contamination and to increase the amount of negative ions which have a growth stimulating action upon the development of the mung bean sprout. The amount of ions generated throughout the unit was approximately 50,000 to 150,000 ions per centimeter. Once harvested, the leaves over ¼ inch long or long, hairy roots and rootlets are discarded for animal feeding. The remainng stem, bean and root is utilized in the next step of the method disclosed herein.

The harvested mung bean sprouts are washed in a high pressure agitating tank to remove he spermoderm or seed coat. The agitating tank includes high pressure water jets to remove the spermoderm seed coat which settled to the top of the tank or water level to be siphoned off or skimmed off. The deskimmed or hulled sprouts are then placed in a centrifuge dryer for two minutes to remove any excess water. Best results have been obtained by setting the centrifuge dryer at 120 rpm for two minutes in the event the sprouts are to be used in the burger mix disclosed hereafter or at 350 rpm in the event the bean sprouts are to be used in the instant soup or protein drink also disclosed herein.

The sprouts are then coated with a wet solution including predominantly water with certain ingredients mixed therein depending upon the desired end food product. The mung bean sprouts are placed in stainless wire screen baskets to be dipped into the particular solution. In the case of the mung bean burger mix, the solution is as follows (all percentages herein are by weight): 90 percent purified water, 3 percent tomato powder, 3 percent onion powder, 4 percent hydrolyzed plant protein. Excellent results have been obtained by changing the coating solution to the following formula: 90 percent water, 4 percent hydrolyzed plant protein, 2 percent tomato powder, 3.5 percent onion powder, 0.5 percent papain (enzyme digestant). The coating solution is blended in a ribbon mixing container at 45 rpm for five minutes with the mung bean sprouts being dipped into the coating mixture for 15 seconds. The coating step improves the binding quality of the sprouts when ground and mixed and further improves the taste of the dehydrated sprouts reducing or eliminating the bitter taste of the sprouts.

A slightly different coating solution is utilized when producing the sprouted mung bean instant soup or protein drink as compared to the burgeer mix. The coating solution for the mung bean instant soup is as follows: 90 percent purified water, 4 percent hydrolyzed plant protein, 3 percent tomato powder, 2 percent onion powder, 1 percent dehydrated honey. The coating solution for the protein drink is as follows: 90 percent filtered water, 2 percent barley malt powder, 3 percent dehydrated honey, 3 percent freeze dried pineapple powder, 2 percent toasted carob powder, 1 percent lemon concentrate powder. The instant soup coating mix is blended in a ribbon blending container at 350 rpm for five minutes with the sprouts dipped in a soaking solution for 15 seconds and drip dried above the soaking container for five minutes. In the case of the protein drink, the coating mixture is allowed to set for 15 minutes before blending in a ribbon mixer. The mixer is mixed for 10 minutes at 50 rpm with a temperature of water of 70° F. to 80° F. The beans are then dipped into the mixture for 30 seconds.

Following will be a description of the remaining steps to produce the mung bean burger mix, mung bean instant soup and mung bean protein drink:

MUNG BEAN BURGER MIX

The coated mung bean sprouts are placed in racks in a convection type atmosphere for dehydration. The sprouts are dehydrated at a steady temperature of 95° F. to 110° F. to protect the mung bean sprout product from losing essential nutritional vitamins and enzymes. The coated sprouts will increase in protein approximately 700 percent from the fresh sprouts to the dried sprouts with the moisture content of the sprouts decreasing to a level less than 10 percent with best results at a level of 5% moisture. The dehydrated sprouts are next ground to a very coarse consistency of approximately 2 mm and are then mixed with the following ingredients (percentage by weight):

60% dehydrated (coated) mung bean sprouts
22.775% soy flour, (5% defatted-42% protein)
4% dehydrated tomato powder including 1% silica as an anticaking agent
7.5% dried onion—minced
0.5% dried onion granules
0.1% papain powder tenderizer
0.25% ground fine dulse (rhodymenia palmata)
0.125% sweet basil—ground fine
0.25% parsley flakes—7 millimeters in size 4.5% hydrolyzed plant protein These dry ingredients are mixed in a ribbon mixer at 80 rpm for 10 minutes with the mix run through a fifteen mesh scren. The mix is then reconstituted with water to make burgers. Alternative combinations for the sprout burger mix are as follows:

EXAMPLE 1

Accomplish the prior given steps and then mix in accordance with the following:
- 30% sprouted mung beans dehydrated and coated in accordance with the prior formula
- 30% sprouted and ground dehydrated soybeans
- 22.775% soy flour 15% defatted
- 4% tomato powder includes 1% silica
- 7.5% onion dried minced
- 1.5% garlic granules
- 0.1% papain powder
- 0.25% dulse powder
- 0.125% sweet basil ground fine
- 0.25% parsley flakes
- 3.5% hydrolyzed plant protein powder

EXAMPLE 2

The coating solution of the mung bean sprouts contains the following:
- 90% water
- 1% arrowroot
- 3% tomato powder
- 2% garlic powder
- 4% hydrolyzed protein Blend well for five minutes at 350 rpm.

Mix the coated ground dehydrated bean sprouts in accordance with the following:
- 45% dehydrated coated mung bean sprouts coarse ground three millimeters
- 15% alfalfa sprouts ground fine
- 20% soy flour 5% defatted
- 5% tomato powder
- 3% chili powder
- 5% minced onion
- 2% garlic granules
- 5% hydrolyzed plant protein

EXAMPLE 3

The coating solution of the mung bean sprouts contains the following:
- 90% water
- 5% tomato powder
- 5% hydrolyzed protein Blend for five minutes at 140 rpm
Dehydrate in convection dryer
Ground very coarse five millimeters
Mix the dehydrated bean sprouts with the following:
- 30% coated mung bean sprouts dehydrated
- 10% sunflower sprouted seed sprouts
- 15% alfalfa sprout flour
- 16% soybean sprout flour
- 7% hydrolyzed plant protein
- 6% tomato powder—1% silica
- 8% onion minced
- 3% garlic granules
- 2% parsley flakes
- 2% chili powder
- 1% dulse

EXAMPLE 4

The mung bean sprouts are soaked in the following solution:
- 90% water (filtered)
- 3% tomato powder
- 1% chili powder
- 5% hydrolyzed plant protein
- 2% powdered onion Coating solution is blended at 350 rpm in a Hobart mixer for five minutes. The coated sprouted mung beans are dehydrated in a convection dryer to a reduction of moisture at 5%. The coated sprouted mung beans are ground to particles sizes of three millimeters.

The coated dehydrated sprout mung beans are mixed according to the following formula:
- 30% coated dehydrated mung bean sprouts (coated before dehydration in a solution of 90% water, 3% tomato powder, 1% chili powder, 5% hydrolyzed plant protein, and 2% powdered onion)
- 15% coarse ground sunflower sprouts dehydrated
- 10% coarse ground soybean sprouts dehydrated
- 10% sesame seeds ground toasted at 350° for five minutes
- 20% soy flour
- 5% tomato powder with 1% silica
- 4.9% hydrolyzed plant protein
- 2% garlic granules
- 0.5 sweet basil power
- 0.1 papain powder
- 0.5 chili powder
- 2% powdered onion Mix ingredients in ribbon mixer at 45 rpm for five minutes.

Filter ingredients through a fifteen mesh screen.

MUNG BEAN INSTANT SOUP

The coated sprouts are spread on trays to dry. A convection dryer truck type is used for drying the mung bean sprouts. The sprouts must not be over one inch high on the trays. The sprouts are dried to a moisture content between 4 and 7% and then ground to a consistency of 0.0045 inch/100 mesh screen.

The dehydrated sprouts are then mixed with the following ingredients:
- 40.3% coated dehydrated mung bean sprouts
- 10% onion powder
- 19% vegetable mixture:
  a. onion—45%—dehydrated
  b. carrots—20%—dehydrated
  c. celery and stalks—20%—dehydrated
  d. green beans—10%—dehydrated
  e. tomato—5%—dehydrated
- 2% parsley powder
- 11% hydrolyzed plant protein powder
- 3% garlic powder
- 1% papain powder
- 2% dulse—sea vegetable
- 1.3% sweet basil powder
- 9.6% tomato powder
- 0.8 chili powder The mixture is ground to 0.0045 inch/100 screen mesh.

This mix represents a new soap blend that can be made in less than two minutes with hot water. The soup and seasoning is especially ideal for weight watchers which contains about 20 calories per 10 gram powder serving. The taste is very satisfying to the appetite and also the mix contains an excellent source amount of vitamins, minerals, and protein compared to the commercial products that are on the market. No preservatives and chemical additives are used because of their inhibiting action upon the food value and upon the digestive tract.

Alternative combinations are as follows:

| Ingredients Dehydrated to 4% Moisture | Examples (Percent by Weight) | | | | | | |
|---|---|---|---|---|---|---|---|
| | 1 | 2 | 3 | 4 | 5 | 6 | 7 |
| Coated dehydrated mung bean sprouts | 32 | 27 | 25 | 30 | 30 | 40 | 25 |
| Onion powder | 12 | 5 | 15 | 10 | 10 | 5 | 5 |
| Vegetable mixture blend | 20 | | 15 | 5 | | 15 | 10 |
| Garlic powder | 5 | 2 | 2 | 3 | 2 | | |
| Papain powder | .5 | | | 1 | 1 | | 1 |
| Dulse powder | 1 | 1 | | 2 | 1 | | |
| Tomato powder | 11 | 55 | 25 | 15 | 15 | 10 | 15 |
| Chili powder | 2 | .5 | 1 | | 1 | | 1 |
| Hydrolyzed plant protein | 7 | 5 | 5 | 10 | 10 | 12 | 8 |
| Parsley | 2 | | 3 | | 3 | 1 | 3 |
| Dehydrated alfalfa sprouts | | | | | 5 | 15 | 5 |
| Dehydrated soy sprouts | | | | | 5 | | 5 |
| Dehydrated sunflower sprouts | | | | | 5 | | 5 |
| Arrowroot powder | | 2 | | 2 | 2 | | 2 |
| Beet powder | | | 3 | | | 2 | |
| Pepper cayenne powder | | | .2 | | .5 | | |
| Dehydrated mushroom powder | | | 2 | 22 | 2 | | |
| Sweet basil | 2 | | .5 | | 1 | | 1 |
| Brewers yeast | 5 | | | | 4 | | 5 |
| Bee pollen | .25 | | | 1 | | | |
| Spirulina | | | .3 | | .5 | | 1 |
| Cardamin | .25 | | | | | | |
| Barley malt | | 2.5 | 2 | | 1 | | |
| Honey | | | | | | | 2 |
| Sesame hulled | | | 2 | | | | 4 |

MUNG BEAN PROTEIN DRINK

The coated, ground and dehydrated mung bean sprouts are formulated into the following mixture:
26% glazed coated mung bean sprouts powder
10% carob powder slightly roasted at 250 for five minutes
3.5% coconut concentrate powder
6% banana flour (freeze dried)
15% brewers yeast (nutritional yeast 65% protein) powder
7% barley malt powder
7% dehydrated honey powder
3% whey (milk byproduct)
2% bee pollen
2% spirulina (plankton)
1% syllium plantago
2% alfalfa sprouts dehydrated
1% dulse powder
2% rose hips powder
8% pineapple dehydrated freeze dried powder
2% lemon concentrate powder
1% orang peel powder
1% papain powder
0.5% ginseng powder
Ingredients are pulverized to 200 mesh 0.0021 inch This drink is complete in all the amino acids (protein complex) high in B vitamins. This drink has a sweet tropical fruit taste. Color medium amber.

Preparation 2 tbls. to 10 oz. water. Shake or blend until even consistency. Ideal for hiking camping and vacuum emergency food. Shelf life in a sealed container is one year. Must be kept in a dry cool area because of the hygroscopic qualities of the ingredients.

While the invention has been illustrated and described in detail in the foregoing description, the same is to be considered as illustrative and not restrictive in character, it being understood that only the preferred embodiments have been shown and described and that all changes and modifications that come within the spirit of the invention are desired to be protected.

What is claimed is:

1. A method of forming mung bean sprouts for a dry food mix comprising the steps of:
    growing mung bean sprouts in darkness under a moist sheet;
    harvesting said sprouts prior to attainment of a height of six inches;
    removing the seed coat associated with said sprouts including directing high liquid pressure against said seed coat;
    coating said sprouts with a wet solution including predominantly water, said coating effective to improve binding properties and reduce bitter taste of said sprouts;
    dehydrating the coated sprouts to a moisture content less than ten percent;
    grinding the dehydrated sprouts; and,
    mixing the ground sprouts with a dry food mix.

2. The method of claim 1 wherein said mixing step includes dry blending the ground sprouts with a dry food mix comprising the following weight percentages:
    60% dehydrated, coated mung bean sprouts
    22.775% soy flour
    4% dehydrated tomato powder
    7.5% dried onion—minced
    0.5% dried onion granules
    0.1% papain powder tenderizer
    0.25% ground fine dulse
    0.125% sweet basil
    0.25% parsley flakes
    4.5% hydrolyzed plant protein.

3. The method of claim 1 wherein said mixing step includes dry blending the ground sprouts with a dry food mix comprising the following weight percentages:
    30% coated dehydrated mung bean sprouts
    30% sprouted and ground dehydrated soybeans
    22.775% soy flour
    4% tomato powder
    7.5% onion
    1.5% garlic
    0.1% papain powder
    0.25% dulse powder
    0.125% sweet basil
    0.25% parsley
    3.5% hydrolyzed plant protein.

4. The method of claim 1 wherein said mixing step includes dry blending the ground sprouts with a dry food mix comprising the following weight percentages:
    45% dehydrated coated mung bean sprouts
    15% alfalfa sprouts
    20% soy flour
    5% tomato powder
    3% chili powder 5% minced onion
2% garlic granules
5% hydrolyzed plant protein.

5. The method of claim 1 wherein said mixing step includes dry blending the ground sprouts with a dry food mix to produce burger mix comprising the following weight percentages:
   30% coated dehydrated mung bean sprouts
   10% sunflower sprouted seed sprouts
   15% alfalfa sprout flour
   16% soybean sprout flour
   7% hydrolyzed plant protein
   6% tomato powder
   8% onion
   3% garlic
   2% parsley
   2% chili powder
   1% dulse.

6. The method of claim 1 wherein said mixing step includes dry blending the ground sprouts with a dry food mix to produce soup mix comprising the following weight percentages:
   40.3% coated dehydrated mung bean sprouts
   10% onion powder
   19% vegetable mixture
   2% parsley
   11% hydrolyzed plant protein
   3% garlic
   1% papain
   2% dulse
   1.3% sweet basil
   9.6% tomato
   0.8 chili powder.

7. The method of claim 1 wherein said mixing step includes dry blending the ground sprouts with a dry food mix comprising the following weight percentages wherein the following ingredients are dehydrated to a level of 4% moisture:
   Coated dehydrated mung bean sprouts: 27%
   Onion powder: 5%
   Garlic powder: 2%
   Dulse powder: 1%
   Tomato powder: 55%
   Chili powder: 0.5%
   Hydrolyzed plant protein: 5%
   Arrowroot powder: 2%
   Barley malt: 2.5%.

8. The method of claim 1 wherein said mixing step includes dry blending the ground sprouts with a dry food mix comprising the following weight percentages:
   26% coated dehydrated mung bean sprouts
   10% carob powder
   3.5% coconut concentrate
   6% banana flour
   15% brewers yeast
   7% barley malt
   7% dehydrated honey
   3% whey
   % bee pollen
   2% spirulina
   1% syllium plantago
   2% alfalfa sprouts
   1% dulse powder
   2% rose hips powder
   8% pineapple dehydrated powder
   2% lemon concentrate
   1% orange peel
   1% papain
   0.5% ginseng.

* * * * *

UNITED STATES PATENT AND TRADEMARK OFFICE
CERTIFICATE OF CORRECTION

PATENT NO. : 4,465,696

DATED : August 14, 1984

INVENTOR(S) : David M. Strahl

It is certified that error appears in the above-identified patent and that said Letters Patent is hereby corrected as shown below:

In column 10, line 24, "% bee pollen" should read --2% bee pollen--

Signed and Sealed this

Eighteenth Day of December 1984

[SEAL]

Attest:

GERALD J. MOSSINGHOFF

Attesting Officer

Commissioner of Patents and Trademarks